Oct. 6, 1931.  F. H. WAGNER, JR  1,825,707
METHOD OF ADSORBING A GAS IN A SOLID ADSORBENT
Filed May 24, 1927  3 Sheets-Sheet 1

FIG. 1.

Inventor
Fred H. Wagner, Jr.
By Watson, Coit, Morse & Grindle
Attorney

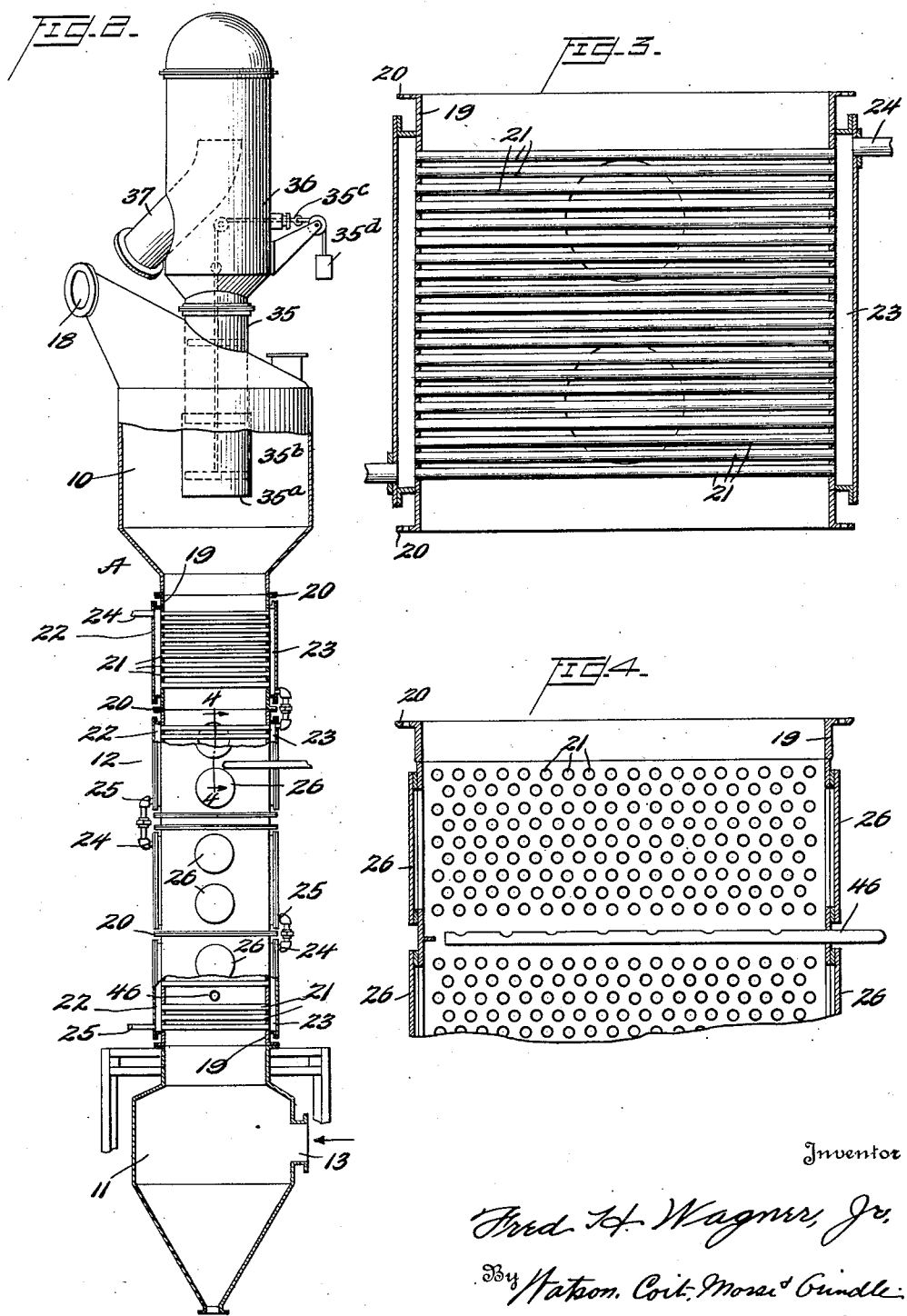

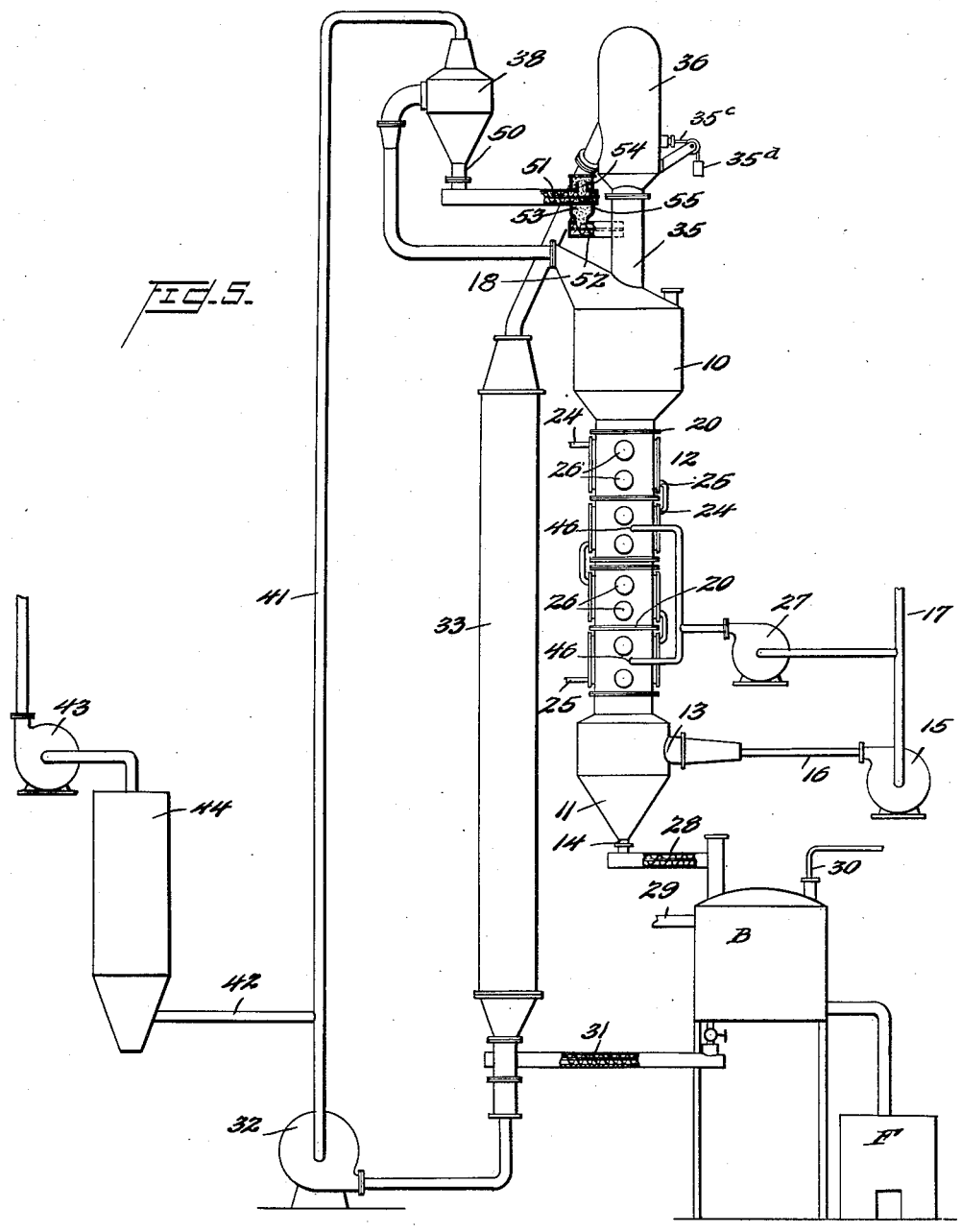

Patented Oct. 6, 1931

1,825,707

UNITED STATES PATENT OFFICE

FRED H. WAGNER, JR., OF BALTIMORE, MARYLAND, ASSIGNOR TO THE SILICA GEL CORPORATION, OF BALTIMORE, MARYLAND, A CORPORATION OF MARYLAND

METHOD OF ADSORBING A GAS IN A SOLID ADSORBENT

Application filed May 24, 1927. Serial No. 193,932.

The present invention relates to a method of separating or recovering a gas from a mixture of gases, the term "gas" as used herein including vapors as well as gases.

This application is a continuation in part of application Serial No. 118,398, filed June 24, 1926.

The method of this invention may be employed for the separation from each other of any two gases, provided they have a sufficient difference in their boiling points. The most common examples of such separation are the removal of moisture from air or other so-called permanent gases, and the separation and recovery of the vapors of volatile liquids such as sulphur dioxide, ether, alcohol, acetone, benzol, gasoline, etc. from mixtures with air or other so-called fixed or permanent gases.

It is an object of the invention to provide a simplified method whereby a gas may be separated or recovered from a mixture of gases continuously and the adsorbing material used over and over.

Another object is to reach the highest possible per cent saturation of the adsorbent with the adsorbable constituents of the mixture of gases.

Another object is to accomplish the adsorption in a single stage.

Another object of the invention is to have a uniform intermixture of the adsorbent and the gases.

A further object of the invention is to provide an adsorption system of the type described, in which high gas velocities may be obtained.

One of the features of an embodiment of this invention consists in the high velocity of the mixture of gases through the apparatus whereby a more rapid rate of heat transfer to the cooling surfaces in the adsorber is obtained.

Another feature of the invention comprises the high velocity of the gas mixture whereby the cross section of the adsorber may be reduced and all parts correspondingly decreased in size.

Briefly stated, the invention consists in effecting a counterflow of the pulverized solid adsorbent through the stream of gases.

In the drawings which illustrate two forms of apparatus for carrying out the invention:

Fig. 1 is a diagrammatic elevation view of an apparatus constructed in accordance with the invention;

Fig. 2 is an enlarged view in elevation, parts being in section, of the adsorber shown in Figure 1;

Fig. 3 is a vertical sectional view through one of the units of the adsorber;

Fig. 4 is a sectional elevation of one of the units taken on the line 4—4 of Figure 2; and Fig. 5 is a view similar to Figure 1, but showing a modified form of apparatus.

Briefly stated, the apparatus for carrying out the method of this invention comprises an adsorbing unit A, the mixture of gases being supplied to the lower end. The solid adsorbent in pulverized condition is supplied to the upper end in such manner that it is uniformly distributed over the cross section of the adsorber and gradually falls through the upwardly rising stream of gases. The adsorbent is collected at the lower end of the adsorber unit and delivered to an activator B wherein it is activated or revivified. After being revivified the adsorbent is returned to the upper end of the adsorbing unit so that the adsorbent moves in a closed path, being used over and over.

The construction of the adsorbing unit is shown in detail in Figs. 2, 3, and 4. It may be said to comprise inlet and expansion chambers 36 and 10 respectively at the upper end, a separating chamber 11 at the lower end and an adsorbing chamber or column 12 connecting chambers 10 and 11. The separating chamber 11 may be of the form shown in Fig. 2 and provided with an inlet 13 through which the mixture of gases or vapors is supplied and an outlet 14 for the discharge of the solid adsorbent. The mixture of gases may be supplied to the inlet 13 with the desired velocity, by any suitable means such as a blower 15 connected to the inlet by a conduit 16, the inlet pipe of the blower being indicated at 17.

The pulverized solid adsorbent is fed through the inlet 37 to the inlet chamber or dome, preferably being carried in suspension in a non-adsorbable gas, for example the gas that has been treated in the adsorber. It will be noted that the expansion chamber 10 has a greater cross section than the central portion of the adsorber unit and that the size of the inlet is small as compared with this cross section.

The inlet pipe 37 projects upwardly within the chamber 36, so that the adsorbent material is well agitated by the change of direction necessary for it to flow downwardly through pipe 35 into the expansion chamber 10.

As the stream of stripped gas carrying the pulverized adsorbent enters the chamber 10 through the pipe 35, the increased size of the expansion chamber in comparison to the size of the pipe 35 permits an expansion of the stream of gas and a decrease in its velocity. Thus the velocity of the adsorbent is reduced so that the adsorbent is distributed uniformly across the entire cross section of the adsorber section 12. Furthermore, the adsorbent is agitated by the upward flow of the stream of gases being treated. Of course, the adsorbent takes up a gas or vapor from the mixture as soon as it comes in contact therewith and this adsorbing action continues while the adsorbent is gravitating downwardly through the adsorbing chamber or column 12. This adsorption generates heat and in some instances the temperature will rise to such a degree as to greatly decrease the adsorptive capacity of the adsorbent. Where it is necessary to lower this temperature, means may be provided to adsorb a portion or nearly all of the heat generated by the adsorption. As shown in the drawings, this may be accomplished by providing conduits extending transversely of the flow of the gases and adsorbent and passing a cooling fluid such as water through the same. Of course, the construction of the adsorbing column may take various forms. In the preferred construction shown in the drawings this column is made up of a series of units shown more in detail in Figs. 3 and 4. Each unit comprises a shell 19 provided at its ends with flanges 20 so that adjacent units can be connected together. Extending transversely of the unit are a plurality of parallel tubes 21 affording communication between the jacket spaces 22 and 23 at opposite sides of the unit. Referring to Fig. 3, the cooling water enters at 24 and flows into the jacket space 23 then through the tubes 21 to the jacket space 22 and leaves through the outlet 25. As shown, each unit may be provided with four inspection holes, closed by the cover plates 26, there being two of these holes in each of two opposite sides of the unit.

The adsorber column 12 may be made up of as many of these units as necessary for the treatment of the particular gases for which the apparatus is installed. Each unit of the adsorber column may be separately supplied with the cooling fluid or as shown in Fig. 2 the outlet 25 of the upper unit may be connected to the inlet 24 of the next lower unit.

In order to further agitate the gases and adsorbent as they pass through the adsorbing column, perforated transverse tubes 46 may project into one or more of the units and be supplied with gas from the blower 27, which may take its supply from the inlet pipe 17.

The lower chamber 11 is made of larger cross section than the adsorbing column so that the pulverized adsorbent settles to the bottom of this chamber. Preferably this bottom is in the form of a hopper and discharges into a conveyor 28 which, as shown, is of the screw type for transferring the adsorbent to the activator B. This activator may be of any suitable type and as shown is heated by hot gases from a furnace F, these gases being discharged at 29. The gas or vapor liberated from the adsorbent is discharged at 30. The revivified or activated adsorbent is taken from the activator and delivered to the inlet 37 at the upper end of the absorber. In the forms of the invention illustrated this is accomplished by feeding the adsorbent from the activator into a stream of gas which raises the adsorbent and supplies it to the adsorber. The adsorbent may be taken from the activator and fed into the stream in any suitable manner as by means of the screw conveyor 31. A fan or blower 32 takes preferably stripped gas from the delivery end of the adsorber and delivers it through the cooler 33 to feed inlet 37, the adsorbent being fed by the conveyor 31 into said stream so that the adsorbent is carried along by the stripped gas in suspension therein and delivered to the adsorber. In its passage through the cooler 33 the adsorbent is cooled.

The pipe or nozzle 35 is adjustable in length, so that its lower or discharge end 35$^a$ may be raised or lowered to regulate the point where the adsorbent is discharged into the upwardly moving gas stream. The gas stream carrying the adsorbent when it leaves the outlet 35$^a$ expands in chamber 10, has its velocity reduced and is thoroughly agitated by the upwardly moving gas stream. The position of outlet 35$^a$ is adjusted so that the adsorbent will gravitate downwardly through the upwardly flowing gas mixture, and will not be diverted to the gas outlet 18. For this purpose the pipe 35 has its end section 35$^b$ telescoped on the main section for up and down movement. This is effected by a cable 35$^c$ at the end of which is a weight 35$^d$ balancing said section 35$^b$.

In some cases it may be necessary to provide means to separate any adsorbent that may be carried along in the gas discharged at 18, although often this is not required.

Where the separator is necessary, the outlet 18 may be connected to any type of separator 38 such as a cyclone separator. As shown in Fig. 1 any adsorbent present in the gas is separated therefrom, in the cyclone, falling through the pipe 39 and being returned as by the conveyor 40 to the cooler 33. The stripped gas from the separator 38 is conducted by the pipe 41 to the inlet of fan 32. Of course, the volume of gas supplied to fan 32 is less than the volume of stripped gas leaving the adsorber through the outlet 18. The excess of gas over that necessary to supply fan 32 passes through conduit 42 to a fan 43. The volume of gas discharged by fan 43 and the volume of gas supplied to fan 32 of course may be controlled by the speeds of the two fans respectively. If necessary, another separator 44 may be interposed between the conduit 42 and fan 43 and this separator may be of the bag type.

From the foregoing it will be seen that the adsorbent flows through the stream of the mixture of gases to be treated in a direction counter to the movement of the stream, and that a uniform and thorough distribution of the adsorbent is obtained in the stream of gas. As a result the adsorbent takes up or adsorbs the predetermined gas or vapor to the greatest possible extent. In other words, the adsorbent becomes saturated with the gas or vapor very nearly to the maximum possible saturation. Because of this increased saturation the quantity of adsorbent in circulation is relatively small so that the whole apparatus in turn is of reduced size, that is to say, the adsorber, the activator, the screw conveyors, etc. are all of minimum size so that the cost of building and operating a plant of this type is at a minimum.

The adsorbing material preferred for the present invention is a hard porous pulverized gel, such as silica gel. Other similar gels such as gels of aluminum oxide, tungsten oxide, stannic oxide, etc. might be employed.

It will be noted that the cooling tubes 21 intersect the paths of the stream of mixture of gases and of the adsorbent and, therefore, act as baffles to effect a thorough intermixture of the gases and adsorbent.

In the operation of the apparatus, shown in Fig. 1, the mixture of gases is supplied to the adsorber unit through the inlet 13 and said gases flow upwardly through the adsorber at a velocity such as to permit the pulverized adsorbent to gravitate slowly through the stream in a direction counter to its flow. The desired period of contact between the mixture of gases and the adsorbent may be obtained by regulation of the velocity of the flow of gases and the quantity of the adsorbent and the degree to which it is pulverized. One or two preliminary runs will determine the proper value of these factors. In actual practice velocities of the flow upwardly of the mixture of gases through the adsorbing chamber as high as 100 to 150 feet per minute have been employed successfully.

In its movement upwardly through the downwardly gravitating adsorbent, the gas or vapor is adsorbed from the mixture and the stripped gases pass out though the outlet 18. Some of the thin gas is returned to the adsorber through the inlet 37 and the balance is removed from the apparatus through the conduit 42.

The adsorbent which collects at the bottom of the separating chamber 11 is transferred to the activator B wherein it is revivified and then fed into the stream of stripped gases that is supplied to the inlet 37. It will be noted that the chamber 10 is enlarged as compared with the adsorbing chamber 12 and as compared with the size of the inlet 35ª. It results, therefore, as the adsorbent continues to gravitate downwardly through the stream of upwardly moving mixture of gases, it is thoroughly and uniformly disseminated throughout the cross section of said stream. Furthermore, the cooling tubes act to further effect a thorough intermixture and the gas supplied through the agitated tubes 46 also aids in effecting this result.

The apparatus disclosed in Figs. 1—4 is extremely satisfactory but the gas velocity through the absorber cannot exceed approximately 150 feet per minute so that the rate of heat transfer to the cooling tubes is relatively low. For handling small quantities of gas, the apparatus, however, is very effective. Where it is desired to handle large volumes of gas, the cross section of the adsorber would become too large. In order to overcome the above mentioned difficulties, the apparatus may be rearranged as shown in Fig. 5.

It is known that for a definite weight of gas per minute moving at a definite velocity the weight of adsorbent material possible to be held in suspension in the gas stream can be calculated to a high degree of accuracy. To understand the operation of the improved form of adsorber, the following example may be of assistance:

Assuming that in an installation of the counterflow type of adsorber, the weight of adsorbent required to be circulated per minute to completely adsorb the desired component from the mixture is 100 pounds and that the weight of gas circulated at, for instance 1,000 feet velocity, is sufficient to pick up 35 pounds of downwardly moving adsorbent per minute, it is obvious that if 135 pounds of adsorbent is introduced into the top of the adsorbent compartment, 100 pounds or the required amount will descend against the upwardly moving stream of gas. For the above values it has been found the adsorbent material such as silica gel should be so pulverized that it has approximately the following analysis:

| | Per cent |
|---|---|
| On a 40 mesh sieve | 1.80 |
| 60 mesh sieve | 3.80 |
| 80 mesh sieve | 6.40 |
| 100 mesh sieve | 18.80 |
| 200 mesh sieve | 49.20 |
| 300 mesh sieve | 11.40 |
| Thru a 300 mesh sieve | 8.60 |

In order to circulate the additional quantity of adsorbent, the apparatus shown in Fig. 1 may be slightly rearranged as shown in Fig. 5. Here the adsorbent discharged by the cyclone separator, instead of being conducted to the bottom of the adsorbent cooler 33 and there introduced into the stripped gas stream with the activated adsorbent, is immediately returned to the pipe 35 which connects the dome 36 to the expansion chamber 10 at the top of the adsorber. This is effected by connecting the cyclone adsorbent outlet 50 to this pipe 35 by means of two worm type conveyors 51 and 52. The conveyor 51 conducts the material to the hopper 53 into which it is emptied from the top of the vertical feed pipe 54. From the hopper 53, the conveyor 52 conducts the adsorbent material directly into the pipe 35 where it mixes with the adsorbent material entering the dome 36.

The feed pipe 54 in the hopper 53 causes a vertical column of adsorbent material to be forced upwardly by the conveyor 51 assisted by the reverse threads 55 on the end thereof beyond the feed pipe 54. This column of material being tightly packed and overflowing through the top of the feed pipe prevents any flow of gas through the conveyor 51. Since the stripped gas blower 32 is constantly withdrawing gas from the cyclone 38 and feeding the same into the dome 36 with the activated adsorbent, it is obvious that the pressure in the pipe 35 is greater than that in the cyclone 38 and therefore the column in the feed pipe 54 is used to prevent a flow of gas from the pipe 35 into the adsorbent outlet of the cyclone.

It is impractical to provide the additional quantity of adsorbent by the construction shown in Fig. 1 since in order to circulate the additional quantity by this arrangement, more stripped gas must be fed by the fan 32 through the adsorbent cooler to entrain the adsorbent. This additional quantity of gas would seriously affect the operation of the device and would require additional power for its recirculation.

An added quantity of adsorbent material is lifted by the gas mixture flowing upwardly through the adsorber column owing to the increased velocity of the gas used in the present modification so that not only the smaller particles are carried into the cyclone, as in the construction disclosed in Fig. 1, but a quantity of the larger particles are also carried over.

The operation of the modification shown in Fig. 5 is similar to that of Fig. 1, previously explained, but a larger quantity of adsorbent material is provided and the mixed gas blower 15 is of such capacity as to force the untreated gas at the desired velocity (1000 feet per minute or higher if desired) through the adsorber column. The velocity of the gas is such as to hold in suspension a certain quantity of the adsorbent as previously explained. The gas is reduced in velocity in the expansion chamber 10 to drop out a quantity of adsorbent material. The adsorbent still in suspension passes with the stripped gas through the outlet connection 18 and on to the cyclone 38. In the cyclone the adsorbent is separated out and is returned to the feed pipe 35 by means of the screw conveyors 51 and 52. The stripped gas passes on through the pipe 41 and the recirculating system as described in connection with Fig. 1.

The reason why a quantity of the adsorbent material is carried through the expansion chamber 10 and into the cyclone may be explained by the fact that although the velocity of the gas is somewhat decreased in the expansion chamber, the velocity of the adsorbent material is not decreased in direct proportion and it is thus carried over into the cyclone.

The operation of the modified form of the device will thus be seen to be dependent upon the recirculation of a quantity of adsorbent material over and above that necessary for the substantial adsorption of all of the desired component from the mixed gases, which additional quantity is equal to that which can be maintained in suspension by the rising column of gases in the adsorber. This excess quantity of adsorbent does not stay in continuous recirculation but some of it continuously finds it way down through the adsorber and is replaced by activated adsorbent material carried up through the adsorbent cooler. Thus the quantity of adsorbent over and above that necessary for practically complete adsorption, but required to obtain circulation of the necessary quantity thru the adsorber, is not ineffective for adsorbing since it is not fully saturated with the adsorbable component of the mixed gases.

The velocity of the mixed gases can be increased very materially by the construction just described. Velocities of over 1000 feet per minute have been obtained in actual practice with very satisfactory results. At this gas velocity the rate of heat transfer to the cooling tubes is considerably augmented and their number can be decreased. Likewise the cross-sectional area of the absorber need not be so great and substantially all other parts can be reduced in size, weight and cost.

Having thus described the invention, what is claimed as new and desired to be secured by Letters Patent is:

1. The method of causing a required quantity of pulverized material per unit of time to gravitate counter to an upward flow of gas capable of lifting in suspension a fixed quantity of said material at a definite velocity of flow, comprising delivering into the upper end of the gas flow a quantity of material per unit of time equivalent to the sum of said required and known quantities and continuously separating the fixed quantity as it is lifted by said gas, and returning it to the upper end of the gas flow.

2. The method of separating a gas from a mixture of gases consisting in effecting an upward flow of the mixture, feeding a pulverized solid adsorent into the stream of gases so that a quantity of said adsorbent gravitates downwardly in suspension through the stream, lifting a portion of said adsorbent with the stripped gas stream, separating the fallen adsorbent from the mixture of gases, treating the fallen adsorbent to liberate the adsorbed gas, returning the treated adsorbent for reuse, separating the stripped gas and lifted adsorbent and returning the lifted adsorbent to the stream of gases.

3. The method of separating a gas from a mixture of gases consisting in effecting an upward flow of the mixture, feeding a pulverized solid adsorbent into the stream of gases so that a quantity of the same gravitates downwardly through the stream, separating this quantity from the mixture of gases, treating the same to liberate the adsorbed gas and revivify the adsorbent for reuse, causing the stripped gas stream to entrain a quantity of said adsorbent, separating said entrained adsorbent from the stripped gas and returning said adsorbent separated from the stripped gas to said upward flow of gas mixture.

4. The method of separating a gas from a mixture of gases consisting in effecting an upward flow of the mixture, continuously feeding a pulverized solid adsorbent into the stream of gases having the velocity of said flow such that a quantity of said material gravitates downwardly and adsorbs said gas to become substantially saturated therewith, and a quantity is entrained by the stripped gas, separating said saturated adsorbent from the mixture of gases, treating such absorbent to liberate the adsorbed gas, returning the treated adsorbent for reuse, separating the entrained adsorbent from said stripped gas and returning said adsorbent for reuse.

5. The method of separating a gas from a mixture of gases consisting in feeding a pulverized solid adsorbent into a stream of nonadsorbable gas so that it is carried along thereby in suspension, directing a stream of a mixture of gases into said nonadsorbable gas in a direction counter thereto, carrying a quantity of said adsorbent counter to said mixture and adsorbing a component thereof, carrying a quantity of said adsorbent along with the residue of said mixture, separating said first mentioned quantity from said mixture, treating the same to liberate the adsorbed gas, returning it to said stream of nonadsorbent gas for reuse, separating said second mentioned quantity from the residue of said mixture and returning it to said nonadsorbable stream.

In testimony whereof I hereunto affix my signature.

FRED H. WAGNER, Jr.